United States Patent
O'Donnell

(10) Patent No.: US 11,255,666 B1
(45) Date of Patent: Feb. 22, 2022

(54) LEVEL FOR USE WITH DRILLS

(71) Applicant: Michael O'Donnell, Bonney Lake, WA (US)

(72) Inventor: Michael O'Donnell, Bonney Lake, WA (US)

( * ) Notice: Subject to any disclaimer, the term of this patent is extended or adjusted under 35 U.S.C. 154(b) by 64 days.

(21) Appl. No.: 16/270,836

(22) Filed: Feb. 8, 2019

Related U.S. Application Data

(60) Provisional application No. 62/628,430, filed on Feb. 9, 2018.

(51) Int. Cl.
*G01C 9/28* (2006.01)
*B25H 1/00* (2006.01)

(52) U.S. Cl.
CPC ............. *G01C 9/28* (2013.01); *B25H 1/0085* (2013.01)

(58) Field of Classification Search
CPC ........................................................ G01C 9/28
USPC ............................................................ 33/334
See application file for complete search history.

(56) References Cited

U.S. PATENT DOCUMENTS

| | | | | |
|---|---|---|---|---|
| 157,212 A * | 11/1874 | Mitchell | .................. | B23B 45/06 81/35 |
| 1,640,020 A * | 8/1927 | Abrahamson | ........ | B25H 1/0085 81/35 |
| 2,806,296 A * | 9/1957 | Weichert | .............. | B25H 1/0085 33/334 |
| 3,052,036 A * | 9/1962 | Oliver | ....................... | G01C 9/36 33/334 |
| 3,664,032 A * | 5/1972 | Tompkins | ................. | G01C 9/24 33/334 |
| 3,664,754 A * | 5/1972 | Kelbel | ..................... | G01C 9/24 408/16 |
| 4,295,279 A * | 10/1981 | Sienknecht | .............. | G01C 9/28 227/156 |
| 4,393,599 A * | 7/1983 | Sterrenberg | ............. | G01C 9/28 33/336 |
| 4,432,146 A * | 2/1984 | Klein | ........................ | G01C 9/28 33/334 |
| 4,457,078 A * | 7/1984 | Suchy | ................... | B25H 1/0085 33/334 |
| 5,051,044 A * | 9/1991 | Allen | .................... | B25H 1/0064 408/92 |
| 7,331,113 B1 * | 2/2008 | Patrick | ..................... | B25F 5/021 33/286 |
| 7,650,699 B2 * | 1/2010 | Yamamoto | .............. | B25F 5/021 33/334 |
| 7,946,049 B1 * | 5/2011 | Wilton | ................. | E04F 21/0092 33/526 |
| 2004/0093749 A1 * | 5/2004 | Wu | ....................... | B25H 1/0092 33/286 |
| 2004/0216314 A1 * | 11/2004 | Ch Fung | .............. | B25H 1/0085 33/334 |

(Continued)

*Primary Examiner* — George B Bennett
(74) *Attorney, Agent, or Firm* — Michael J. Tavella

(57) ABSTRACT

A level that is attached to the drill bit. It is on a bar that allows the level to be offset from the drill bit so that it is visible by the operator. The bar has a bearing in it that allows the bit to spin freely while holding the level in a set position. The level has a ball that centers in a ring when it is level and plumb. To use the device, after it is installed in a drill, the operator adjusts the position of the drill until the ball is in the center of the ring. Then, the drill bit is plumb and the hold will be true. The operator merely has to watch the level and adjust the drill as needed to maintain plumb to ensure a true hole.

10 Claims, 7 Drawing Sheets

(56) References Cited

U.S. PATENT DOCUMENTS

| | | | |
|---|---|---|---|
| 2007/0227017 A1* | 10/2007 | Milligan | G01C 15/004 33/228 |
| 2009/0165313 A1* | 7/2009 | Borinato | B25F 5/021 33/263 |
| 2009/0249711 A1* | 10/2009 | Galimberti | E04F 15/04 52/127.6 |
| 2014/0000921 A1* | 1/2014 | Vanko | G01C 9/00 173/11 |

* cited by examiner

LEVEL FOR USE WITH DRILLS

CROSS REFERENCE TO RELATED APPLICATIONS

This application claims benefit of Provisional application 62/628,430 filed Feb. 9, 2018.

STATEMENT REGARDING FEDERALLY SPONSORED RESEARCH AND DEVELOPMENT

Not Applicable

BACKGROUND OF THE INVENTION

1. Field of the Invention

This invention relates to levels for use with drills and particularly to levels that are viewed while a drill is in use.

2. Description of the Prior Art

When drilling holes, for example, in concrete for anchors. It is important that the hole be plumb this is because rod installed in these holes must also be plumb or they will not align properly with other parts. It is possible to have a person hold a square or a small level to the side of a drill bit prior to drilling to check for plumb, while the drill is being held by another. It may even be possible to have that person remain in position during the drilling operation. This is, of course, impractical and potentially dangerous. It is also inefficient relying on two people do do the work. It is virtually impossible to hold a level adjacent to a drill bit, but it may be possible to position a speed square near the bit. That gives the drill operator a check of the plumb of the bit. But it is at best an inaccurate one.

BRIEF DESCRIPTION OF THE INVENTION

The instant invention provides a solution to this problem. It is a level that is attached to the drill bit. It is on a bar that allows the level to be offset from the drill bit so that it is visible by the operator. The bar has a bearing in it that allows the bit to spin freely while holding the level in a set position. The level has a ball that centers in a ring when it is level and plumb. To use the device, after it is installed in a drill, the operator adjusts the position of the drill until the ball is in the center of the ring. Then, the drill bit is plumb and the hold will be true. The operator merely has to watch the level and adjust the drill as needed to maintain plumb to ensure a true hole.

DETAILED DESCRIPTION OF THE INVENTION

Figure 1:
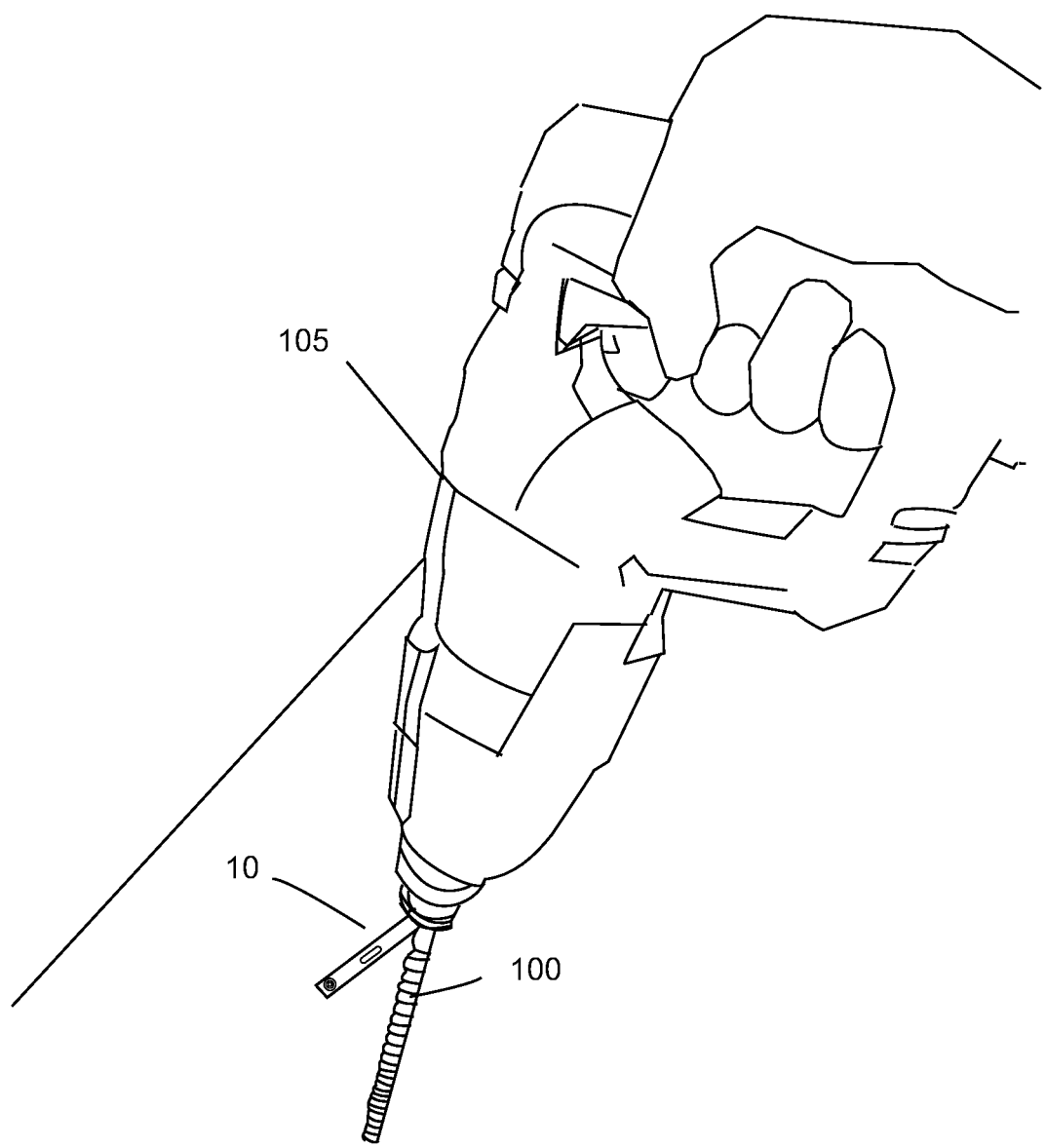
FIG. 1 a side perspective view of a drill showing the invention installed.

Referring now to the drawings, FIG. 1, a side perspective view of a drill showing the invention installed is shown. The invention 10 is shown in a drill 105 mounted on a bit 100 as shown. Note how the device 10 is butted up against the chuck of the drill. A bearing in the device allows the bit to turn freely while the device stays in a fixed position. Note that the invention can be used with rotary hammer drills, or with conventional drills, as desired or as conditions necessitate.

Figure 1A:
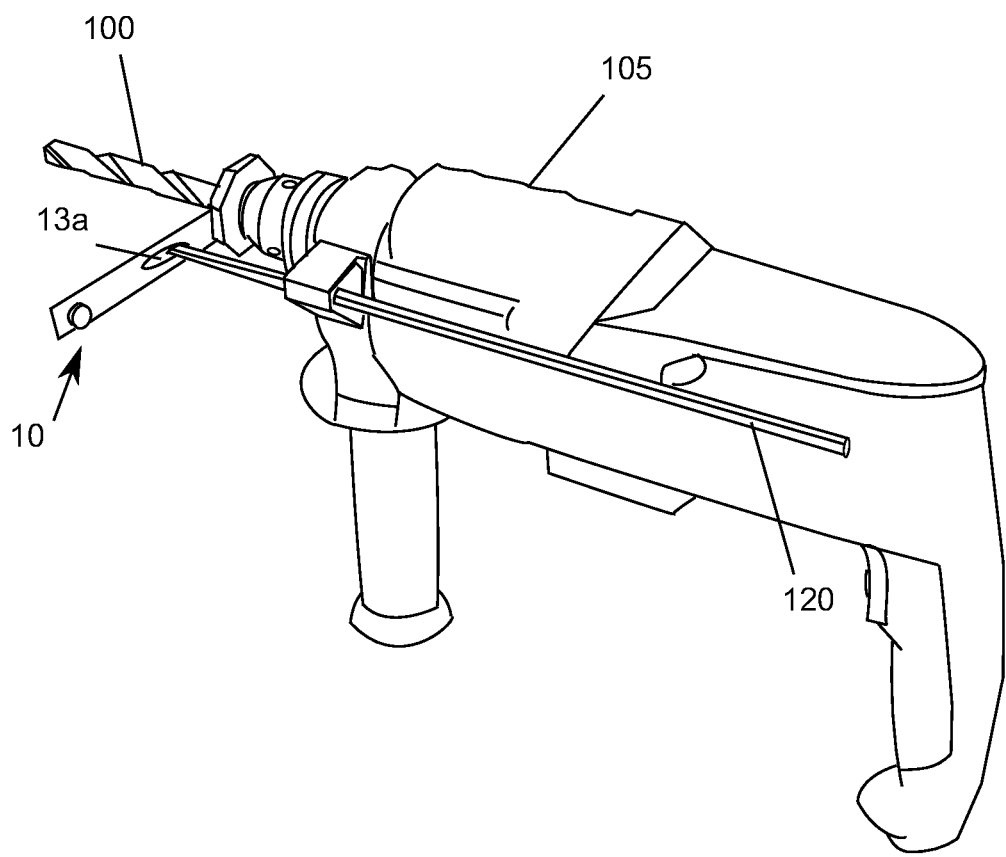
FIG. 1*a* is a perspective view of a rotary hammer drill with the invention installed and the depth rod passing through the slot in the invention.

FIG. 1*a* is a perspective view of a rotary hammer drill with the invention installed and the depth rod passing through the slot in the invention. In this view, the depth rod 120 is shown. These rods are commonly provided on these drills to st a depth limit for the drill. Note that the invention 10 has a slot 13*a* (see FIG. 7, e. g.) through which the depth rod passes. The depth rod 120 rod helps hold the device in position during use, as discussed below.

Figure 2:
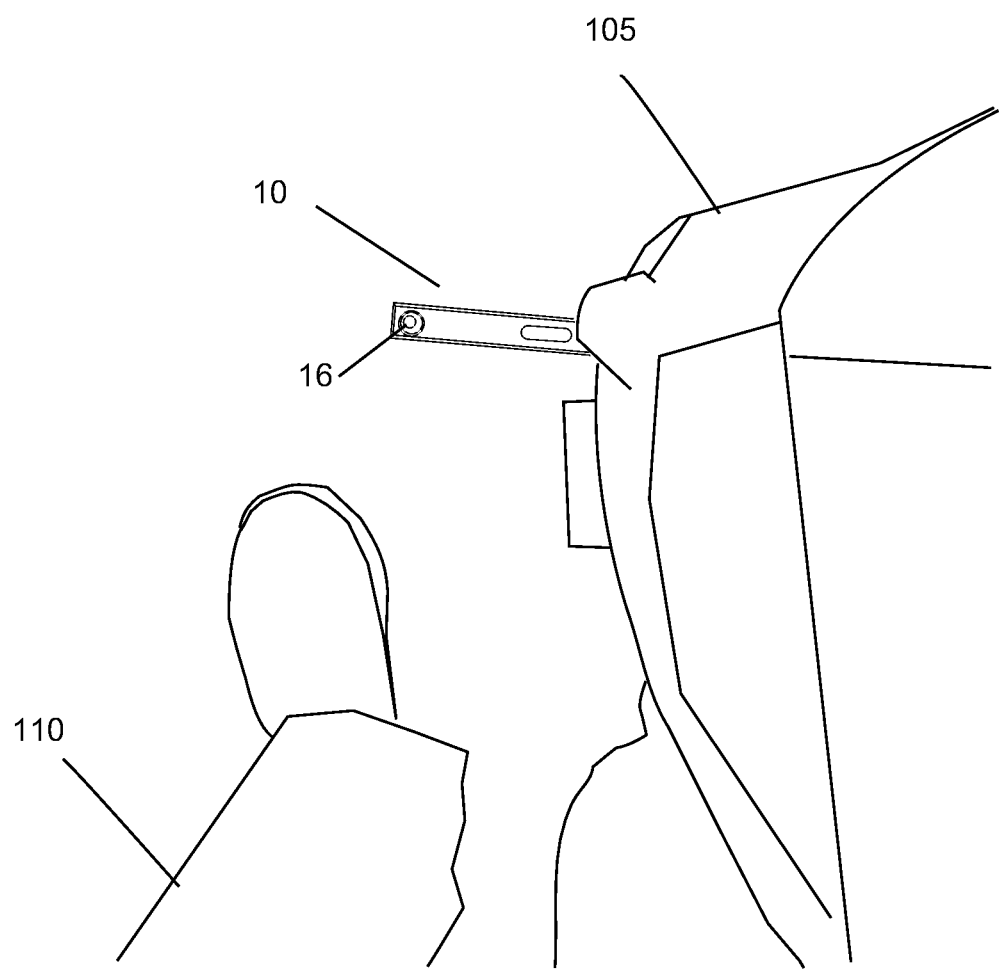
FIG. 2 is a top perspective view of the invention installed on a drill.

FIG. 2 is a top perspective view of the invention installed on a drill showing the view of an operator 110 viewing the drill and the invention. When the drill is plumb with the surface to be drilled, the operator can proceed to drill. This figure shows how an operator actually uses the device. By holding the drill vertically, with the bit on the surface to be drilled, the user looks at the level 10 until the bubble 16 is centered in the ring, as discussed below. Once the bubble is centered, the drill 105 is plumb and the hole can be drilled. As the hole progresses, the user can monitor the level to ensure that the hole remains true. Note, in this view, the depth rod 120 is omitted to better show the invention.

Figure 3:
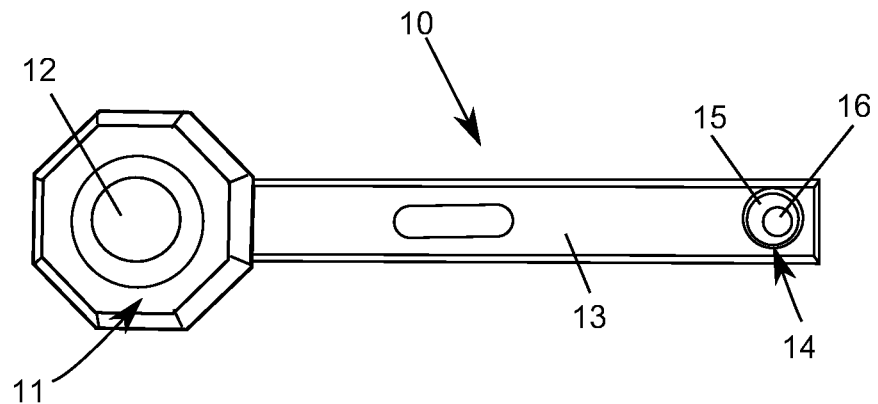
FIG. 3 is a top view of of the level device.

FIG. 3 is a top view of the level device 10. The device consists of a mounting section 11 that connects to a drill bit (see, FIG. 5). It has a bearing 12 that allows the bit to rotate without spinning the level 10. A bar 13 connects the attachment piece 11 to the level 14. The bar is used to offset the level component to the side so that it is visible to the user, (see, FIGS. 1 and 2). The level 14 is a circular bubble level. See FIG. 8. It has a bubble 16 that floats within the body of the level 15 and indicates level and plumb so that when the bubble is completely centered in the level 14, the drill is plumb to the surface and the hole made by it will be true.

Figure 4:
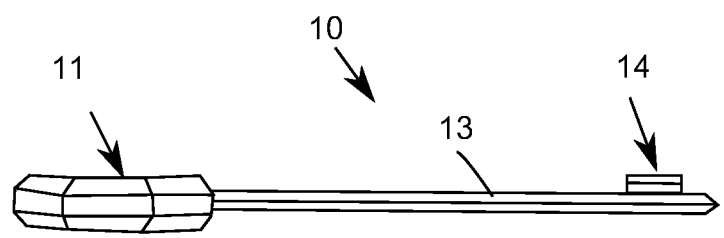
FIG. 4 is a side view of the level device.

FIG. 4 is a side view of the level 10. The mounting section 11, the bar 13 and the level 14 are shown.

Figure 5:
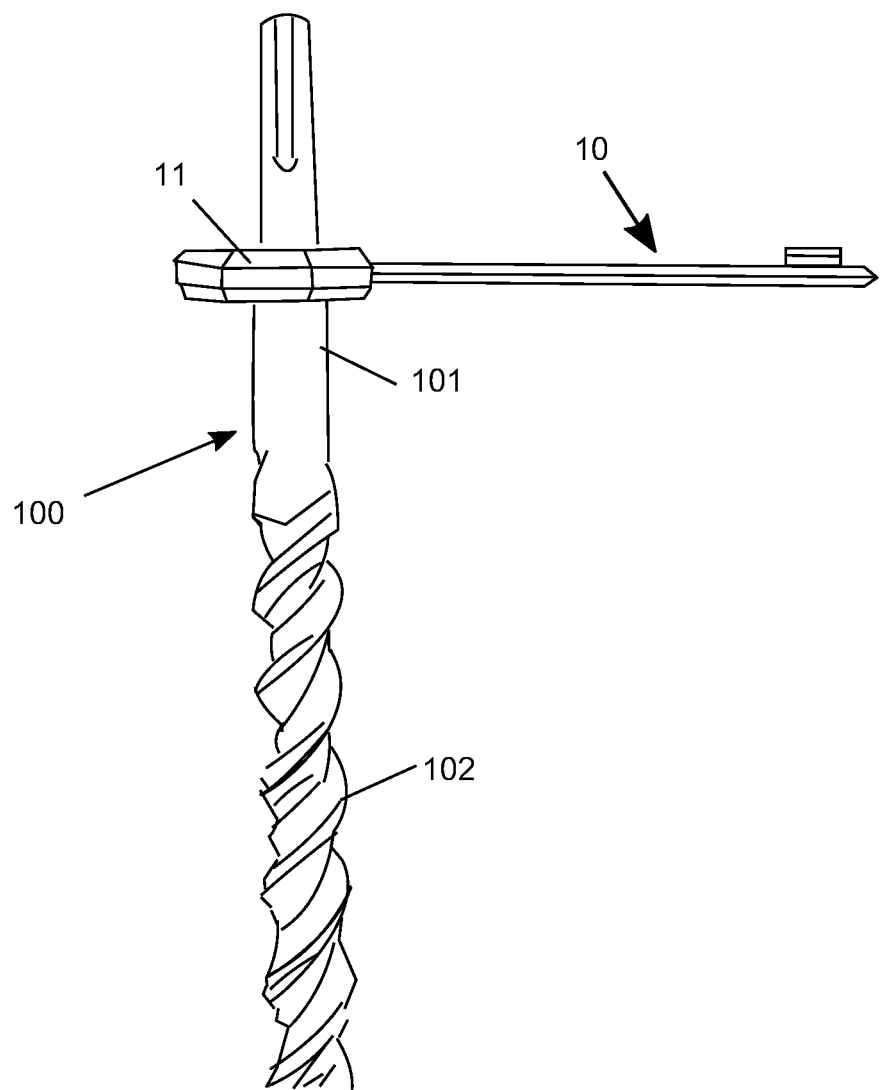
FIG. 5 is a side detail view of the level installed on a drill bit.

FIG. 5 is side a detail view of the level 10 installed on a drill bit 100. The device is designed to be held in place by inserting the bit 100 upwardly through the bearing 12 until the the the bit shaft 101 contacts the chuck of the drill. Since the bearing is smaller than the cutting flutes 102 of the bit, it cannot fall off. Friction holds the device in place and the bearing allows it to remain in place while the drill turns. Also, as discussed below, the depth rod 120 (see FIG. 1*a*), which is found on every rotary hammer type drill, can be extended through the slot 13*a* to help hold the device in position.

Figure 6:
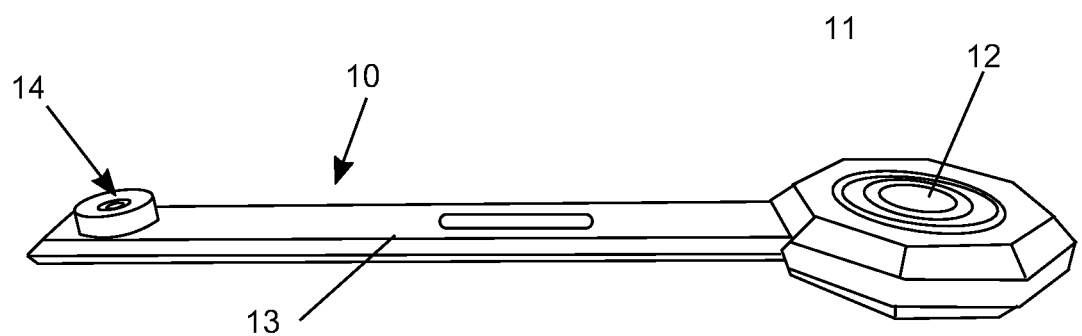
FIG. 6 is a side perspective view of the level device.

FIG. 6 is a side perspective view of the level device. Here, the level 14 is shown on the surface of the bar 13. Note too, the bearing 12 in the mounting section 11.

Figure 7:
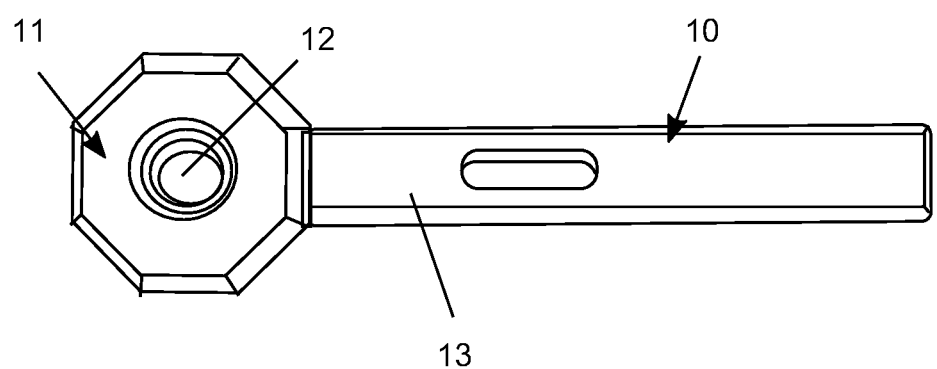
FIG. 7 is a bottom view of the level device.

FIG. 7 is a bottom view of the invention. Here, the bearing 12 is clearly shown inside the mounting section 11. The level, being mounted on the top of the bar 13 cannot be seen from the bottom. Note that there is a slot 13*a* cut into the bar 13 to accept a depth rod (see FIG. 1*a*), which helps hold the device in position and keeps it from rotating during use.

Figure 8:
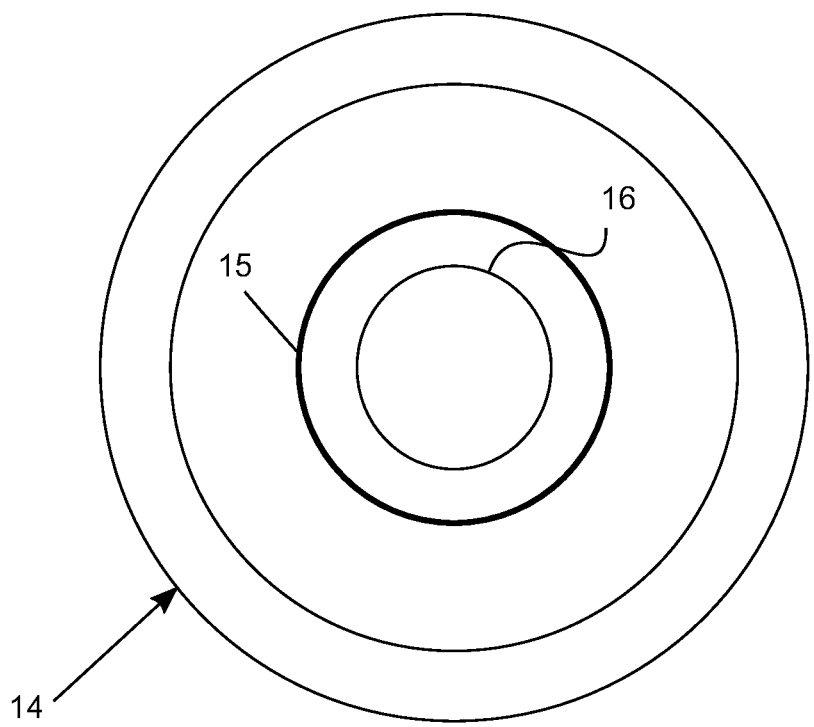
FIG. 8 is a detail view of the level component of the device that shows the bubble centered in the ring.

FIG. 8 is a detail of the level 14 showing the ring 15 and the bubble 16. Note that the level 14 is a clear housing containing fluid. Within the fluid is the bubble 16. The ring 15 is painted or printed on the top of the housing as shown. When the level is level, the bubble is centered in the housing and is contained within the ring when viewing from above.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A level for use with a drill, having a depth rod thereon, comprising:
   a) a mounting section, having a bearing therein;
   b) a bar section, having a proximate end, a distal end and an upper surface, said proximate end of said bar section being attached to said mounting section and extending outwardly therefrom; and
   c) a bubble level, installed on the distal end of said bar section.

2. The level of claim 1 further comprising a slot formed in said bar section.

3. The level of claim 1 wherein the bubble level is position on said upper surface of said bar section.

4. The level of claim 1 wherein the bearing is a ball bearing.

5. The level of claim 1 wherein the bar section is generally rectangular.

6. The level of claim 2 wherein the slot formed in said bar section is sized to accept the depth rod from said drill such that said depth rod extends through said slot.

7. The level of claim 1 wherein the level is positioned on a drill bit.

8. The level of claim 7 wherein wherein the drill bit is placed through said mounting section.

9. The level of claim 8 wherein the level is held in place by friction.

10. The level of claim 7 wherein the bearing in said mounting section allows said drill bit to turn such that the bar section remains stationary.

\* \* \* \* \*